US006709743B1

(12) United States Patent
Draveling

(10) Patent No.: US 6,709,743 B1
(45) Date of Patent: Mar. 23, 2004

(54) PELLETIZED CHROMATOGRAPHY MEDIA OF AGAROSE, DEXTRAN OR ACRYLAMIDE/AZLACTONE COPOLYMER

(75) Inventor: Connie A. Draveling, Brookfield, WI (US)

(73) Assignee: Pierce Biotechnology, Inc., Rockford, IL (US)

( * ) Notice: Subject to any disclaimer, the term of this patent is extended or adjusted under 35 U.S.C. 154(b) by 29 days.

(21) Appl. No.: 10/130,852
(22) PCT Filed: Nov. 21, 2000
(86) PCT No.: PCT/US00/31928

§ 371 (c)(1),
(2), (4) Date: May 23, 2002

(87) PCT Pub. No.: WO01/38083

PCT Pub. Date: May 31, 2001

Related U.S. Application Data

(63) Continuation of application No. 09/449,301, filed on Nov. 24, 1999, now abandoned.

(51) Int. Cl.[7] .............................. B32B 5/16; B01D 15/08
(52) U.S. Cl. ....................... 428/402; 210/263; 210/284; 210/656; 210/657; 428/407
(58) Field of Search ................................ 428/403, 407, 428/402; 210/263, 284, 656, 657

(56) References Cited

U.S. PATENT DOCUMENTS

| 3,969,274 | A | * | 7/1976 | Frampton ................... 252/456 |
| 4,070,286 | A | * | 1/1978 | Iler et al. ................... 210/31 C |
| 4,443,366 | A | * | 4/1984 | Sakagami et al. ...... 260/112 R |
| 4,879,340 | A | * | 11/1989 | Moriguchi et al. ........ 525/54.2 |
| 5,011,667 | A | * | 4/1991 | Kuznicki et al. ........... 423/118 |
| 5,114,577 | A | | 5/1992 | Kusano et al. |
| 5,328,603 | A | | 7/1994 | Velander et al. |
| 5,453,186 | A | | 9/1995 | Muller et al. |
| 5,565,318 | A | | 10/1996 | Walker et al. |
| 5,718,969 | A | | 2/1998 | Sewall et al. |
| 6,150,151 | A | | 11/2000 | Khandke |
| 6,398,962 | B1 | * | 6/2002 | Cabrera et al. ............. 210/635 |
| 6,437,012 | B1 | * | 8/2002 | Wang .......................... 521/32 |

FOREIGN PATENT DOCUMENTS

EP     0 298 171     1/1989

* cited by examiner

*Primary Examiner*—H. Thi Le
(74) *Attorney, Agent, or Firm*—Cahn & Samuels, LLP

(57) ABSTRACT

A pellet composed of an aggregate of distinct beads of a chromatography media. The pellet is coherent and capable of being rapidly hydrated on addition of water to form a gel wherein said beads are swollen and substantially uniformly dispersed in the water phase.

17 Claims, 3 Drawing Sheets

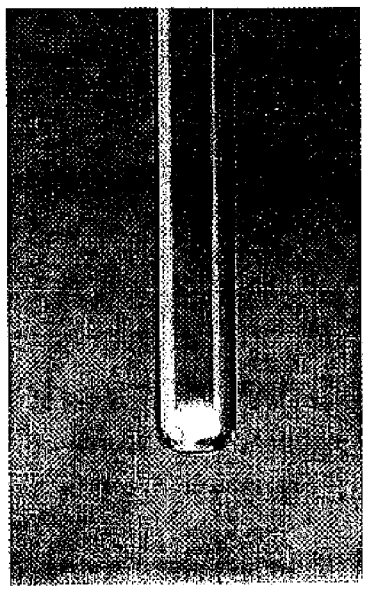 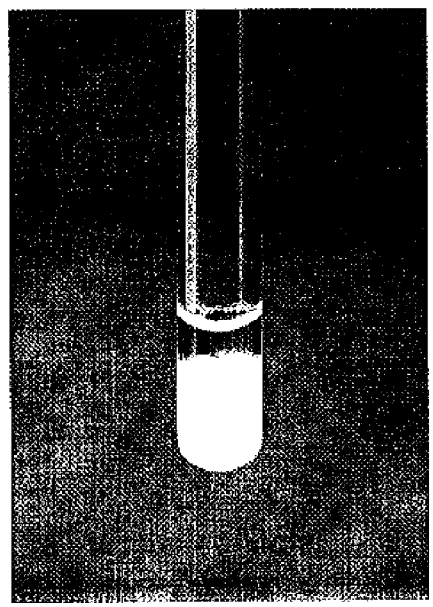
Fig. 3                    Fig. 4

US 6,709,743 B1

PELLETIZED CHROMATOGRAPHY MEDIA OF AGAROSE, DEXTRAN OR ACRYLAMIDE/AZLACTONE COPOLYMER

This application is a 371 of PCT/US00/31928 filed Nov. 21, 2000, which is a continuation of Ser. No. 09/449,301 filed Nov. 24, 1999 now abandoned.

I. TECHNICAL FIELD

The present invention relates to chromatography and, more particularly, to chromatography media in the form of a coherent pellet which rapidly hydrates when combined with water to form a gel useful for chromatography applications.

II. BACKGROUND

Purification of substances by chromatography, particularly employing high throughput technologies, is increasingly popular in the area of life science research. Traditionally, purification has been performed using columns containing the chromatography media in gel (slurry) form consisting of discrete beads of the media uniformly dispersed in a selected aqueous buffer. Column-based techniques are desirable from the viewpoint of large binding capacity; however, limitations arise when high throughput is desired since only several columns can be accommodated simultaneously.

To increase throughput, microcentrifuge spin columns, using about 1 ml or less of gel volume, have been used. Speed is thereby increased as is the ability to perform multiple (~12–24) separations at one time. To achieve higher throughput with similar gel volume, the use of gel dispersed in microtiter-filter plates, such as available from Whatman, Polyfiltronics, has become popular. Using these plates 96 or more purifications can be performed simultaneously.

Several problems, however, are encountered when using microtiter filter plates. The chromatography media tends to settle during dispensing of gel into the discrete wells, thus making it difficult to equalize the volume of media in all wells, particularly when dispensing is performed automatically, e.g., robotically. Also, because the gel is in the form of an aqueous slurry in the wells, it can leak out of the "drip director" or spillover the side walls of the wells, particularly if the gel is dispensed into the wells prior to arrival in the laboratory. A further problem centers on the lack of stability of many gel slurries, especially at room temperature. This results in the inability to store large batches of the gel for extended periods of time for sequent use in multiple purifications and assays.

One final drawback encountered with the use of currently available chromatography gels is that the gel usually must be first washed and then subsequently equilibrated in the aqueous medium (buffer) chosen for the desired application. This, of course, necessitates additional procedural steps for the end user and, accordingly, is time consuming.

III. SUMMARY OF THE INVENTION

Now, however, in accordance with the present invention, there is provided chromatography media in a form which obviates the problems heretofore encountered as discussed above. The present invention concerns a pellet and method for its manufacture and use where the pellet is a chromatography media characterized by a coherent aggregate of distinct beads having a capacity to resist a force, as demonstrated by a Schleuinger Pharmatron hardness of at least about 2 Kilo Ponds, and capable of being rapidly hydrated on addition of water to form a gel.

In one form, the invention defines a material in the form of a practically dry pellet comprising an aggregate of distinct beads of a selected chromatography media. On addition of an aqueous medium, the pellet rapidly hydrates to form a chromatography gel wherein the beads are swollen and substantially uniformly dispersed in the aqueous phase. An additional important feature of the pellet of the present invention is that the aggregate of beads is coherent as characterized as having a Schleuinger Pharmatron hardness, determined as hereinafter described, of at least about 2 Kilo Ponds (KP). In an additional aspect of this invention, the chromatography media is cross-linked agarose, dextran, or an acrylamide/azlactone copolymer, preferably those varieties thereof which are considered highly cross-linked indicating that the media can resist collapse under high column pressure. Agarose, designated by the manufacturers as "fast" or "super" flow, is representative of a highly cross-linked media.

Being essentially dry and coherent, pellets can be placed, or as hereinafter described formed in situ, in the wells of microtiter or microfilter plates, and the plates immediately used, stored or shipped for future use; the problems of leakage, spillage and stability encountered with otherwise preformed gels being eliminated. For use, one needs only add the appropriate aqueous medium and, since hydration occurs almost immediately, rapid assays and high throughputs can be achieved.

In accordance with a further aspect of the present invention, there is provided a method for the preparation of the pelletized chromatography media described above. The process involves placing a chosen bed volume of an aqueous gel containing beads of a chromatography media in the bottom of a receptacle so that the gel molds into the bottom of the receptacle to an observable depth. Thereafter, the gel is dried under conditions of time, temperature and humidity selected to provide a pellet which is coherent and has the capacity to resist a force and is capable of being rapidly hydrated on the addition of water to form a gel wherein the beads are swollen and substantially uniformly dispersed in the water phase.

IV. BRIEF DESCRIPTION OF THE DRAWINGS

FIG. 3 is a photograph of a substantially dry pellet of the present invention which was formed and is in place in the bottom of the illustrated test tube.

FIG. 4 is a photograph of a gel formed by hydrating the pellet shown in FIG. 3; the photograph being taken about 60 seconds after the addition of water to the test tube.

V. DESCRIPTION OF THE ILLUSTRATED EMBODIMENT

As used herein, the term "consisting essentially of" in reference to the pellet means that an aggregate of beads of chromatography media is indispensably necessary, but that other constituents which do not detract from the desirable properties of the pellet can also be present. Such constituents may include, without limitation thereto, residues from buffers in which the gels originally exist, or in which they are equilibrated or derivatized prior to pellet formation. Stabilizers to promote pellet integrity and/or to preserve ligand activity where the media includes a ligand, such as sucrose, may also be present.

In order to realize the advantages heretofore identified, an important aspect of the present invention is that the pellet be practically dry and coherent. Reference to "practically dry" means that the pellet is dry in appearance and feel, but with sufficient residual moisture to achieve coherency, presumably by hydrogen bonding, between the beads of the chromatography media. The most useful moisture content depends upon the particular media involved. However, in keeping with this aspect of the present invention, a moisture content of the pellet of less than about 10%, preferably 1%–6% and, especially, 2–4%, is considered useful. As referenced herein, moisture content is measured by Karl-Fischer method using a Metrohm 688KF oven, a Metrohm 684KF coulometer and Metrohm 649KF titration unit with an extraction time of 15 minutes and an oven temperature of about 142°.

The pellet of the present invention generally has a weight of about 4–30 mg. However, pellets with greater weights, e.g., up to 65 mg and above, are not excluded so long as they have the other characteristics associated in the present invention. Higher weights are generally associated with pellets containing additives or stabilizers.

Figure 1:
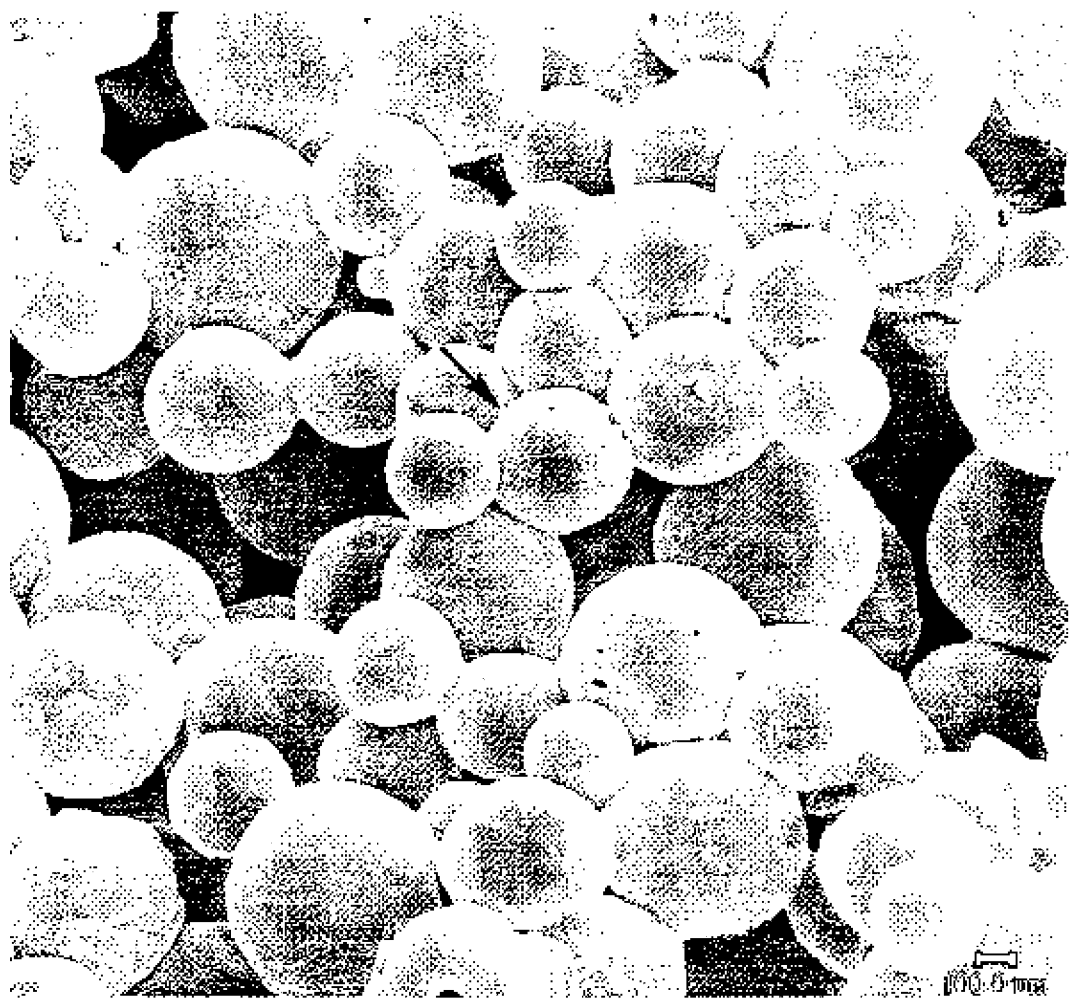
FIG. 1 is a copy of an electron-microscope photograph of a pellet of the present invention illustrating the distinct beads of the chromatography media (nickel chelated cross-linked agarose) prepared as in Example II.

As stated and shown in FIG. 1, the pellet of this invention is a coherent aggregate of beads of the chromatography media having the indicated hardness. The aspect of being a "coherent aggregate" lo distinguishes the pellet from simply an accumulation of bead particles in powder form such as results from freeze-drying of customary gels. As opposed to a powder, the coherent aggregate of beads of this invention has the capacity to resist a force, as evidenced by exhibiting a Schleuinger Pharmatron (SP) hardness. This hardness is measured in a Schleuinger Pharmatron tablet tester 6D in accordance with manufacturer's instructions. A pellet with a Schleuinger Pharmatron hardness of at least about 2 KP, generally at least about 6 KP and, preferably, at least about 8 KP exhibits coherency to satisfy the objectives of the present invention.

Referring still to the important characteristics of the pellet of the present invention, on the addition of water thereto, usually as an aqueous buffer selected based on the desired chromatographic application, the pellet is capable of rapid hydration, i.e., swelling of the beads and the formation of a gel or slurry wherein the beads of the chromatography media are substantially uniformly dispersed throughout the aqueous medium. As shown in FIG. 4, satisfaction of the aspect of rapid hydration is best noted by simple visual examination, uniform gel formation being readily apparent. The speed of hydration to form the gel is generally complete within about 120 seconds, and usually within about 60 seconds, after the addition of water. To achieve gel formation, agitation is generally not necessary.

Figure 2:
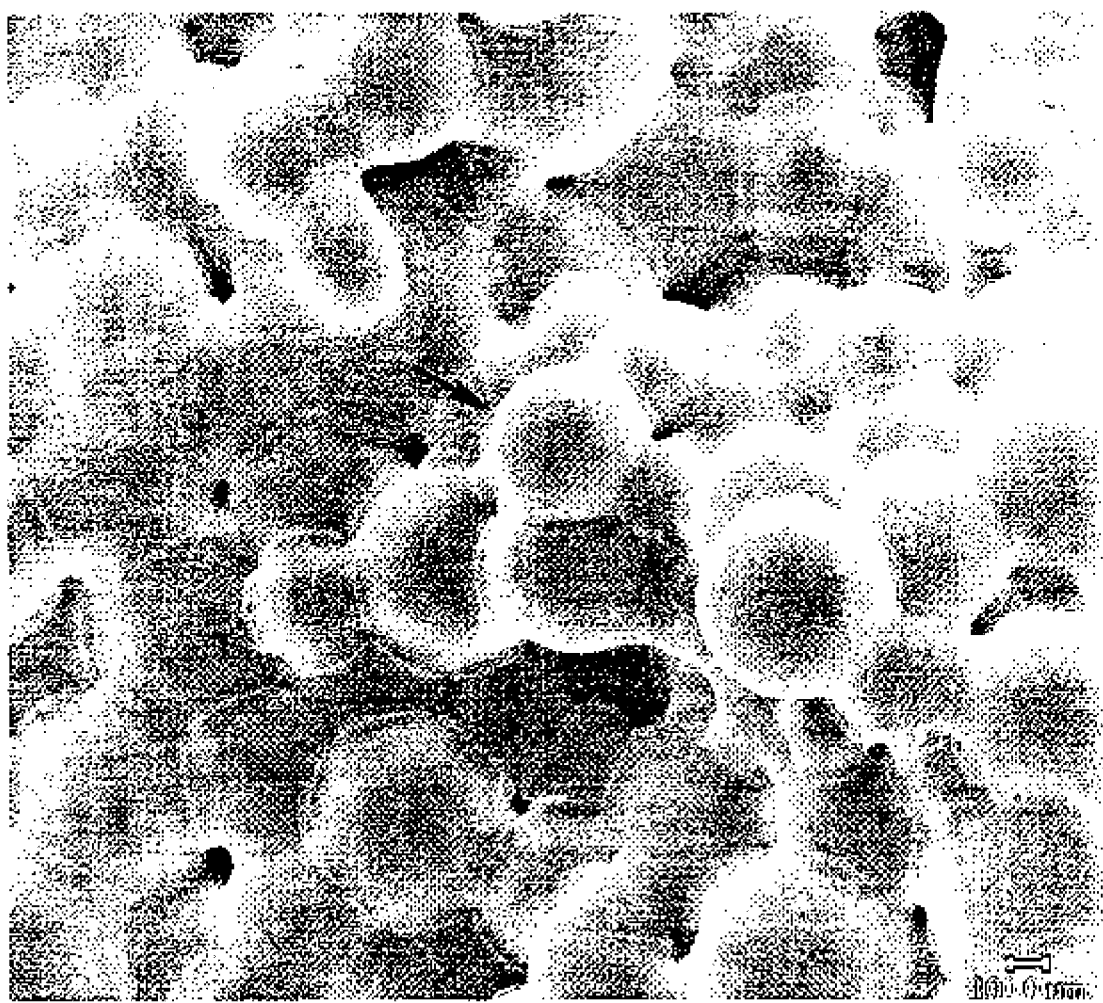
FIG. 2 is a copy, for comparative, purposes of an electron-microscope photograph of a nickel chelated non-cross-linked agarose chromatography media wherein there is an absence of distinct beads and, as a result, this pellet does not rapidly rehydrate.

Formation of the pellet of the present invention can be accomplished by dehydrating (drying) a chosen bed volume, placed in the bottom of a receptacle, for example, a test tube or wells of a micro-titer plate or other depressions, of an aqueous gel containing beads of a chromatography of media under selected conditions of time, temperature, and humidity. Bed volumes of gel (50–75% resin) on the order of 100 $\mu l$–1000 $\mu l$ are considered most useful, an important consideration being that the wet gel molds into the bottom of the receptacle in which it is dispensed to an observable depth so that pellet formation can be achieved. A further important aspect is that, for a given media and volume, the conditions selected be conducive to the formation of a pellet with the specified characteristics with respect to coherency and rapid hydration. For example, rapid drying such as under vacuum or at very low humidity or high temperature, can result in the formation of a fragmented, non-coherent pellet or, as shown in FIG. 2, a dry pellet which may be coherent, but which does not hydrate in an acceptable time. In turn, sufficient time, an adequate temperature, and necessary humidity needs to be provided to achieve adequate bonding of individual beads to provide pellet coherency and assure uniform bead dispersion in the hydrated gel.

One preferred method of pellet formation in accordance with the present invention involves open atmospheric drying of a slurry of beads under conditions of temperature and humidity, which are or approximate existing ambient, i.e., a temperature of 20° C.–35° and a humidity of 20%–60%. Another preferred method utilizes a temperature and humidity controlled chamber with temperatures of 10° C.–40° C. and humidities of 15%–30%. With both of the above methods, useful pellets can be formed in about 24–96 hours. The drying process can be accelerated by a higher temperature and lower humidities, but the risk of inadequate pellet formation increases. The mass of useful pellets depends on the chromatography media used and amount of original slurry. Generally pellets prepared from 100–1000 $\mu l$ of 50%–75% slurry will have a weight of about 4–65 mg.

While the present invention is considered applicable with respect to a variety of chromatographic media, media based on agarose, dextran and acrylamide/azlactone copolymer are considered to be the most useful, particularly the cross-linked varieties, and especially those which are deemed highly cross-linked. With the preferred media, the formation of pellets according to the present invention having the desired characteristics of coherency and hydration can be conveniently prepared under the conditions as heretofore identified.

The following Examples illustrate the present invention.

EXAMPLE I

This Example illustrates the preparation of pellets according to the present invention from the following commercially available chromatography gels from Amersham Pharmacia Biotech (APB).

| Gel Type | Description |
| --- | --- |
| DEAE "SEPHAROSE" FAST FLOW | Highly cross-linked diethylamino- Ethyl derivatized agarose, Generally useful as ion exchange Chromatograph media. |
| CM "SEPHAROSE" FAST FLOW | Highly cross-linked carboxymethyl Derivatized agarose, generally useful as ion exchange chromotography media. |
| Q "SEPHAROSE" FAST FLOW | Highly cross-linked quaternary ammonium derivatized agarose generally use full as ion exchange chromatography media. |
| SP "SEPHAROSE" FAST FLOW | Highly cross-linked sulfoproyl derivatized agarose, generally useful as ion exchange chromatography media. |
| G25 "SEPHADEX" | Cross-linked dextran, generally useful as size exclusion chromatography media. |

The "Sepharose" gels contained 20% ethanol which was removed and the gels equilibrated as follows: 175 ml of a 75% gel slurry (130 ml resin) was washed 5× with an equal volume of "Milli Q" water Tris-Buffered Saline (TBS) and then the resin was equilibrated by addition of an equal volume of Tris-Buffered Saline (TBS), pH 8.0. After decanting, a 50% slurry mix was then generated by the addition of 130 ml of TBS. The "Sephadex" gel was equilibrated in like fashion using Phosphate Buffered Saline (PBS) instead of TBS.

200 µl of the 50% slurry mixes generated above were pipetted into the wells of five separate 96 well regular polystyrene microtiter plates with flat bottoms and also into the wells of five 800-µl capacity filter plates (Polyfiltronics Unifilter 800). The gels contained in the wells were then allowed to dry under the following conditions: Temperature, 22–25° C.; humidity level, 40–45%. After 96 hours of drying under the above conditions, white, opaque disk shaped coherent pellets were observed to have formed in the bottom of the wells of both types of plates. Several pellets were removed intact from the wells. The pellets removed from the wells in each plate were tested for moisture content and hardness, the averaged results of which are as follows:

| Gel Type | Hardness (KP) | Moisture Content % |
|---|---|---|
| DEAE "SEPHAROSE" FAST FLOW | 7.5 | 1.1 |
| CM "SEPHAROSE" FAST FLOW | 5.2 | 4.1 |
| Q "SEPHAROSE" FAST FLOW | 6.5 | 1.7 |
| SF "SEFHAROSE" FAST FLOW | 7.3 | 1.1 |
| G25 "SEPHADEX" | 6.4 | 3.8 |

100 µl of water was pipetted into those wells of the plates still containing pellets. In all instances, hydration of the pellets to form gels with swollen beads uniformly dispersed in water occurred within 1 minute without agitation.

EXAMPLE II

This Example illustrates the preparation of pellets according the present invention wherein the chromatography media is nickel-chelated agarose, a media used for the affinity purification of 6×His-tagged fusion proteins.

Nickel chelating "Sepharose" Fast Flow from APB (Code #17-0575, a highly cross-linked agarose) was washed with five gel volumes of "Milli QU" water and chelated with nickel using 0.1M Nickel Sulfate. Unbound nickel was removed by repeated washing with "Milli Q" water and the chelated gel was equilibrated with 50 mM Sodium Phosphate Buffer (pH 8.0) containing 300 mM NaCl and 10 mM Imidazole, decanted and then resuspended in one gel volume of the same buffer to generate a 50% gel slurry.

200-µl of the 50% gel slurry was dispensed into the wells of a 96-well filter plate (Polyfiltronics) and the slurry dried at about 25° C., humidity about 40%. After about 96 hours, practically dry (less than 5% moisture) coherent pellets, weighing about 11 mg, had formed in the bottom of the wells. The pellets had a hardness of about 7 KP and a moisture content of 2–4%.

100-µl of E.coli lysate, containing 6×His-tagged GFP fusion protein, was added directly to each pellet contained in a well of the plate. Substantially immediately (within about 30 seconds), it was observed that the pellets were completely hydrated in the lysate.

A shallow well collection plate was then placed under the filter plate and the unit centrifuged at 500×g for 3 minutes to remove the flow through. After Sodium Phosphate Buffer (pH 8.0) subsequent washings with 50 mM containing 300 mM NaCl and 75 mM Imidazole, the bound GFP fusion protein was eluted four times with the same buffer but containing 250 mM Imidazole. Samples from each step were analyzed by protein assay (BCA method) and by SDS-PAGE analysis. The results obtained using the pellets formed in accordance with the present invention were substantially the same as a similarly performed separation using the Nickel Chelating Fast Flow "Sepharose" gel directly, thus indicating that formation of the pellet does not adversely affect the affinity separation capacity of the nickel chelated gel.

EXAMPLE III

This Example illustrates the preparation of chromatographic media in accordance with the present invention wherein agarose includes, as ligands, Protein A or Protein L, which, along with Protein G, have been recognized as binding antibodies and, accordingly, are useful immunoassay techniques employing affinity chromatography.

Protein A and Protein L derivatized cross-linked agarose gels available from the owner of the present invention, Pierce Chemical Company, under the trademark "ImmunoPure" were washed and equilibrated in Pierce IgG Binding Buffer to generate a 50% gel slurry. 200 µl of the so equilibrated slurries were deposited into the wells of 96-well filter plates and allowed to dry for 72 hours at 25° C.–35° C. and 40–45% humidity. Coherent, disk shaped, opaque coherent pellets were formed.

To each of the wells containing the pellets, 100 µl of goat antiserum diluted 1:1 with Pierce IgG Binding Buffer were added. It was observed that hydrated gels having the desirable characteristics described herein with respect to uniformity were rapidly formed. After centrifugation, repeated washing and elution, the goat protein was analyzed by SDS-PAGE and stained with "GelCode" Blue protein stain reagent from Pierce Chemical Company. As with the derivatized agarose pellets described in Example III, after hydration, the pellets described in this Example III functioned similar to the gel directly available from Pierce.

The prior examples have illustrated the preparation of pellets which, on hydration, function in substantially the same manner as the original wet gel. There are, however, instances where this may not be exactly so, particularly with respect to certain gels which have been derivatized in a manner such that the ligand may exhibit some instability when dried. In such a case, additives may be included during drying of the pellet in order to maintain ligand activity by preventing denaturation. Sugars such as sucrose, trehalose, and sorbitol are known to be useful for this purpose.

Examples IV and V illustrate two such cases. Example IV shows the preparation of a pellet prepared from agarose derivatized to contain streptavidin as a ligand. EXAMPLE V illustrates the preparation of a pellet prepared from agarose derivatized to contain glutathione as a ligand. In chromatography, streptavidin is useful because of its strong affinity to biotin and thus capable of capturing biotinylated molecules such as nucleotides and peptides. In turn, glutathione is useful for the purification of glutathione-S-transferase (GST) from fusion proteins prepared by recombinant procedures.

EXAMPLE IV

200 µl (50% gel slurry) of "Ultra-Link", a streptavidin derivatized cross-linked bis-acrylamide/azlactone copolymer available from Pierce Chemical Company was washed and equilibrated (0.1M sodium bicarbonate, pH 8.1–8.3, containing 10% sucrose) and then dried at 35° C., 40% humidity under a 50 watt bulb (6–7 inches away) for about 3 days with attendant pellet formation as hereinbefore described. The pellet rehydrated in 15 seconds on addition of 100 µl of water. With the addition of sucrose to the equilibration buffer, the pellet functioned in the same manner in binding efficiency as the wet gel from Pierce without sucrose addition.

EXAMPLE V

"Sepharose" 6 Fast Flow in a gel slurry was derivatized by conventional techniques with a linker, 1-4-butanediol diglycidyl ether, and then reacted with glutathione. After washing with water and then reconstituting with water containing 2.5% sucrose, pellet formation in accordance with this invention was achieved by drying 400 µl of a 50% slurry in a chamber maintained at 28° C., 15% humidity for about 70 hours. The pellet was rehydrated within three minutes by the addition of 200 µl of water. Thereafter a bacterial lysate containing GST tagged protein was added to the hydrated pellet. Unbound proteins were removed by washing and the GST eluted by known method. The derivatized chromatography media of this Example V gave substantially equivalent performance in purification of the GST tagged protein as the original wet gel without addition of the additive.

V. INDUSTRIAL APPLICABILITY

A rapidly rehydratable, coherent, collapse-resistant, monolithic pellet chromatography media providing, upon rehydration, a gel exhibiting a high throughput for purification of substances where the gel features uniformly dispersed swollen beads. The pellet media can be formed into a select configuration and to provide a shape stable body for storage, transport, and handling in its unhydrated form and may be derivatized with a ligand to pemit purification. The media is rapidly hydratable to form a gel without significant loss of is binding efficiency and is particularly suited for use in a broad range of environments including laboratory and field chromatography applications based on its functional and structural stability. As described above, the media is particularly useful in microtiter plate applications and is particularly suited for use in the life sciences

I claim:

1. A pellet of chromatography media of agarose, dextran or acrylamide/azlactone copolymer characterized by a coherent aggregate of distinct beads having a capacity to resist a force, as demonstrated by a Schleuinger Pharmatron hardness of at least about 2 Kilo Ponds, and capable of being rapidly hydrated on addition of water to form a gel.

2. The pellet of claim 1 whereupon the addition of water swells the beads which are substantially uniformly dispersed in said water phase.

3. The pellet of claim 2 wherein the hardness is at least about 6 KP.

4. The pellet of claim 3 having a moisture content at about 1–6%.

5. A process of preparing the pellet of claim 1 comprising placing a chosen bed volume of an aqueous gel containing beads of the chromatography media in the bottom of a receptable so that the gel molds into the bottom of the receptacle to an observable depth, drying the gel under conditions of time, temperature and humidity selected to provide a pellet which is coherent and has the capacity to resist a force and is capable of being rapidly hydrated on the addition of water to form a gel wherein the beads are swollen and substantially uniformly dispersed in the water phase.

6. The process of claim 5 wherein the bed volume is 100–1000 µl.

7. The process of claim 5 wherein the media is cross-linked.

8. A practically dry pellet consisting essentially of an aggregate of distinct beads of a chromatography media of agarose, dextran or acrylamide/azlactone copolymer, said pellet being coherent and having a capacity to resist a force, as demonstrated by a Schleuinger Pharmatron hardness of at least about 2 Kilo Ponds, and capable of being rapidly hydrated on addition of water to form a gel wherein said beads are swollen and substantially uniformly dispersed in said water phase.

9. The pellet of claim 8 wherein the chromatography media is cross-linked.

10. The pellet of claim 9 wherein the media is cross-linked dextran.

11. The pellet of claim 9 wherein the media is cross-linked agarose.

12. The pellet of claim 9 wherein the media is cross-linked acrylamide/azlactone copolymer.

13. The pellet of claim 9 wherein the hardness is at least about 6 KP.

14. The pellet of claim 9 having a moisture content of 2–4%.

15. The pellet of claim 8 having a moisture content at about 1–6%.

16. The pellet of claim 15 wherein the chromatography media is cross-linked agarose, dextran or an acrylamide/azlactone copolymer.

17. The pellet of claim 16 wherein the hardness is at least about 6 KP.

* * * * *